US009908610B2

(12) United States Patent
Clos (10) Patent No.: US 9,908,610 B2
(45) Date of Patent: Mar. 6, 2018

(54) AIRCRAFT CARGO HANDLING SYSTEM ARTICULATING BALL MAT

(71) Applicant: THE BOEING COMPANY, Chicago, IL (US)

(72) Inventor: William R. Clos, Chicago, IL (US)

(73) Assignee: The Boeing Company, Chicago, IL (US)

( * ) Notice: Subject to any disclaimer, the term of this patent is extended or adjusted under 35 U.S.C. 154(b) by 111 days.

(21) Appl. No.: 15/009,510

(22) Filed: Jan. 28, 2016

(65) Prior Publication Data

US 2017/0217561 A1   Aug. 3, 2017

(51) Int. Cl.
*B64C 1/22*   (2006.01)
*B64C 1/20*   (2006.01)
*B60P 1/52*   (2006.01)
*B64D 9/00*   (2006.01)

(52) U.S. Cl.
CPC ............ *B64C 1/20* (2013.01); *B60P 1/52* (2013.01); *B64C 1/22* (2013.01); *B64D 9/003* (2013.01)

(58) Field of Classification Search
CPC ...... B64C 1/22; B64D 9/003; B64D 2009/006
USPC .................................................. 414/532, 536
See application file for complete search history.

(56) References Cited

U.S. PATENT DOCUMENTS

| | | | | |
|---|---|---|---|---|
| 2,323,279 A * | 6/1943 | Van Zelm | ................ | B64C 1/22 244/118.3 |
| 3,262,588 A * | 7/1966 | Davidson | ................ | B60P 1/52 244/137.1 |
| 3,381,921 A * | 5/1968 | McDonough | ......... | B64D 9/003 105/370 |
| 3,920,205 A * | 11/1975 | Bell | ......................... | B64C 1/22 410/14 |
| 4,416,579 A * | 11/1983 | Alberti | ..................... | B64C 1/20 410/94 |
| 4,544,319 A * | 10/1985 | Folling | ..................... | B64C 1/22 198/457.03 |
| 4,860,973 A * | 8/1989 | Fenner | ..................... | B64C 1/22 198/463.3 |
| 5,014,935 A * | 5/1991 | Dalbera | .................... | B64C 1/22 244/137.1 |
| 5,101,962 A * | 4/1992 | Pritchard | ................ | B64C 1/20 198/369.4 |
| 5,106,038 A * | 4/1992 | Dupont | ..................... | B64C 1/20 244/118.1 |

(Continued)

FOREIGN PATENT DOCUMENTS

JP    05319163 A  * 12/1993

*Primary Examiner* — James Keenan
(74) *Attorney, Agent, or Firm* — Haynes and Boone, LLP (57) ABSTRACT

Systems, methods, and apparatus for an aircraft cargo handling system articulating ball mat are disclosed. In one or more embodiments, a method for transferring cargo across a stepped threshold and into a sloped compartment involves moving the cargo across the stepped threshold and onto a ball mat located within the sloped compartment, where the ball mat is configured in a substantially horizontal position. In one or more embodiments, the surface of the ball mat comprises at least one conveyance device (e.g., at least one roller ball and/or at least one caster). The method further involves configuring the ball mat in a sloped position. Further, the method involves moving the cargo off the ball mat and into the sloped compartment.

22 Claims, 8 Drawing Sheets

(56) References Cited

U.S. PATENT DOCUMENTS

| | | | | |
|---|---|---|---|---|
| 5,184,366 A * | 2/1993 | Rawdon | ............... | B64C 1/22 |
| | | | | 14/71.5 |
| 5,265,991 A * | 11/1993 | Herrick | ............... | B60P 7/13 |
| | | | | 244/118.1 |
| 5,390,775 A * | 2/1995 | Herrick | ............... | B64C 1/20 |
| | | | | 193/35 MD |
| 6,125,984 A * | 10/2000 | Huber | ............... | B64C 1/20 |
| | | | | 193/35 MD |
| 6,164,892 A * | 12/2000 | Malloy | ............... | B64F 1/368 |
| | | | | 198/370.1 |
| 7,214,015 B2 * | 5/2007 | Bruns | ............... | B60P 7/0815 |
| | | | | 410/102 |
| 7,604,204 B2 * | 10/2009 | Jacobsen | ............... | B60P 1/36 |
| | | | | 244/118.1 |
| 8,152,206 B2 * | 4/2012 | Schettel | ............... | B64D 9/003 |
| | | | | 244/118.1 |

\* cited by examiner

AIRCRAFT CARGO HANDLING SYSTEM ARTICULATING BALL MAT

FIELD

The present disclosure relates to a ball mat. In particular, it relates to an aircraft cargo handling system articulating ball mat.

BACKGROUND

Currently, there is no known conventionally-used solution for loading cargo into and out of significantly sloped aircraft cargo compartment doorway floor areas. The existing solution for aircraft without significantly sloped compartment doorway floor areas is a doorway area conveyance surface referred to as a ball mat. A typical ball mat contains a series of roller balls (e.g., one inch (1") diameter spherical balls each supported by one-eighth inch (⅛") diameter bearings that allows for the horizontal movement of cargo in all directions; these roller balls are also referred to as ball transfer units (BTUs)) spaced approximately six inches (6") apart. The ball mat is mounted parallel to the aircraft floor. If a typical ball mat were to be used on a significantly sloped aircraft compartment floor, a cargo handler would be unable to safely control the movement of heavy cargo. As such, aircraft damage caused by the cargo contacting the aircraft door frame, or injuries to the cargo handler caused by the high push or pull forces needed to control the movement of heavy cargo, are likely to occur. For example, the push or pull force required to handle a six-hundred (600) pound (lb) container in a Boeing 737 aft cargo compartment would be approximately 100 pounds (lbs). Applying 100 lbs of push or pull force in a Boeing 737 cargo compartment is difficult for a cargo handler because the height of the compartment is only about forty-five inches (45"). As such, there is a need for a solution for loading heavy cargo into and out of significantly sloped aircraft cargo compartment doorway floor areas.

SUMMARY

The present disclosure relates to a method, system, and apparatus for an aircraft cargo handling system articulating ball mat. In one or more embodiments, a method for transferring cargo across a stepped threshold and into a sloped compartment involves moving the cargo across the stepped threshold and onto a ball mat located within the sloped compartment, where the ball mat is in a substantially horizontal position. In one or more embodiments, the surface of the ball mat comprises at least one conveyance device (e.g., at least one roller ball and/or at least one caster). The method further involves configuring the ball mat in a sloped position. Further, the method involves moving the cargo off the ball mat and into the sloped compartment.

In one or more embodiments, the method further involves configuring the ball mat in the substantially horizontal position. In at least one embodiment, the configuring of the ball mat in the substantially horizontal position is enabled by using a manual lever, an electrical motor, a hydraulic actuator, and/or a pneumatic actuator.

In at least one embodiment, the configuring of the ball mat in the sloped position is enabled by using a manual lever, an electrical motor, a hydraulic actuator, and/or a pneumatic actuator.

In one or more embodiments, when the cargo is moved onto the ball mat, at least one container stop lever, located proximate a first side of the ball mat and on the surface of the ball mat, is configured in a down position such that at least one container stop lever is flush with the surface of the ball mat.

In at least one embodiment, when the cargo is moved onto the ball mat, at least one container stop, located proximate a second side of the ball mat and on the surface of the ball mat, is configured in an unrestrained up position.

In one or more embodiments, when the ball mat is configured in the sloped position, at least one container stop, located proximate a second side of the ball mat and on the surface of the ball mat, is configured in an unrestrained down position, thereby allowing the cargo to move off of the ball mat.

In at least one embodiment, the sloped compartment is a cargo compartment of an aircraft.

In some embodiments, at least one conveyance device is at least one roller ball and/or at least one caster.

In one or more embodiments, a method for removing cargo from a sloped compartment and across a stepped threshold involves moving the cargo onto a ball mat located within the sloped compartment, where the ball mat is in a sloped position. In at least one embodiment, the surface of the ball mat comprises at least one conveyance device (e.g., at least one roller ball). The method further involves configuring the ball mat in a substantially horizontal position. Further, the method involves moving the cargo off the ball mat and across the stepped threshold.

In at least one embodiment, the method further involves configuring the ball mat in the sloped position. In one or more embodiments, the configuring of the ball mat in the sloped position is enabled by using a manual lever, an electrical motor, a hydraulic actuator, and/or a pneumatic actuator.

In one or more embodiments, the configuring of the ball mat in the substantially horizontal position is enabled by using a manual lever, an electrical motor, a hydraulic actuator, and/or a pneumatic actuator.

In at least one embodiment, when the cargo is moved onto the ball mat, at least one container stop, located proximate a second side of the ball mat and on the surface of the ball mat, is configured in an unrestrained down position, thereby allowing the cargo to move onto the ball mat.

In one or more embodiments, when the cargo is moved onto the ball mat, at least one container stop lever, located proximate a first side of the ball mat and on the surface of the ball mat, is configured in an up position, thereby securing the cargo from moving towards the first side of the ball mat.

In at least one embodiment, when the ball mat is configured in the substantially horizontal position, at least one container stop lever, located proximate a first side of the ball mat and on the surface of the ball mat, is configured in a down position such that at least one container stop lever is flush with the surface of the ball mat.

In one or more embodiments, when the ball mat is configured in the substantially horizontal position, at least one container stop, located proximate a second side of the ball mat and on the surface of the ball mat, is configured in a restrained up position, thereby securing the cargo from moving off of the ball mat.

In one or more embodiments, a system for transferring cargo across a stepped threshold and into a sloped compartment involves a ball mat located within the sloped compartment, where a surface of the ball mat comprises at least one conveyance device (e.g., at least one roller ball and/or at least one caster). In at least one embodiment, when the cargo is moved across the stepped threshold, the ball mat is configured in a substantially horizontal position. In one or more embodiments, the ball mat is configured in a sloped position to move the cargo off of the ball mat and into the sloped compartment.

In at least one embodiment, the ball mat further comprises at least one container stop lever, located proximate a first side of the ball mat and on the surface of the ball mat, configurable in an up position or a down position.

In one or more embodiments, the ball mat further comprises at least one container stop, located proximate a second side of the ball mat and on the surface of the ball mat, configurable in an up position or a down position.

In at least one embodiment, the ball mat is enabled to be configured in the sloped position or the substantially horizontal position by using a manual lever, an electrical motor, a hydraulic actuator, and/or a pneumatic actuator.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIGS. 5 through 7 illustrate the steps of cargo being transferred across a stepped threshold and into a sloped compartment, in accordance with at least one embodiment of the present disclosure. In particular, these figures illustrate the linkage mechanism used to configure the ball mat from a substantially horizontal position to a sloped position, in accordance with at least one embodiment of the present disclosure.

FIGS. 8 through 12 illustrate the steps of cargo being transferred across a stepped threshold and into a sloped compartment as well as the cargo being removed from the sloped compartment and across the stepped threshold, in accordance with at least one embodiment of the present disclosure. In particular, these figures illustrate the bar mechanism used to configure the container stop in an up position or in a down position, in accordance with at least one embodiment of the present disclosure.

Each figure shown in the disclosure shows a variation of an aspect of the embodiments presented, and only differences will be discussed in detail.

DESCRIPTION

The methods and apparatus disclosed herein provide an operative system for an aircraft cargo handling system articulating ball mat. The system of the present disclosure features a cargo handling system conveyor plane used for omni-directional movement of heavy cargo in the doorway area of an airplane's cargo compartment. The conveyor plane, referred to as a ball mat, consists of multiple roller balls (or other conveyance devices) allowing for low friction movement of the cargo. Unlike existing ball mats, the disclosed ball mat allows for cargo to be easily loaded (and unloaded) when the airplane's doorway area floor has a significant slope. The disclosed ball mat is able to be configured from a substantially horizontal position to a sloped position, and vice versa, in order to facilitate easy loading and unloading of cargo.

The disclosed ball mat of the present disclosure allows for heavy pieces of cargo to be loaded on airplanes that have a significantly sloped doorway area floor, such as all Boeing 737 aft cargo compartments. The ability to load heavy pieces of cargo increases an airplane's capability. Revenue freight, collections of baggage, or containerized parcels are examples of heavy cargo. Assembling small parcels or baggage into a larger unit reduces the time needed to load and unload an airplane, thereby resulting in increased utilization of the airplane. Assembling small parcels or baggage into a larger unit can be done in a warehouse with enhanced ergonomic conditions or automation; whereas loading loose parcels or baggage in the confined space of an airplane compartment can be strenuous to the cargo handler. Assembling small parcels or baggage into a larger unit reduces the potential for lost pieces, damage from handling or water, and theft.

The disclosed ball mat comprises a mechanism used to configure the ball mat from a substantially horizontal position (e.g., which is used when moving heavy cargo onto and off of the airplane) to a sloped position (e.g., which is used when moving heavy cargo from the airplane's doorway area forward or aft into the cargo compartment), and vice versa. Unlike existing ball mats that are mounted flat to, or substantially flush with, the compartment floor, the disclosed ball mat is hinged and has a means to enable pivoting about the hinge.

The disclosed ball mat could be used in conjunction with an existing ground-based cargo conveyor-belt loader located outside the aircraft doorway area. The existing conveyor-belt loader is powered, and could be used to move the heavy cargo onto the disclosed ball mat, which would be configured in a substantially horizontal position. Once the cargo is moved onto the ball mat, the ball mat lever (e.g., a manual lever) would be raised to configure the ball mat in a sloped position. Then, the cargo could be moved off of the ball mat and into the compartment. An electric motor and/or hydraulic or pneumatic actuator could also be used to raise and/or lower the ball mat.

For removal of cargo from the compartment, once the cargo is moved onto the ball mat, which is configured in a sloped position, the ball mat lever would be lowered to configure the ball mat to a substantially horizontal position. When in the substantially horizontal position, the ball mat would be even with the ground-based cargo belt loader.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to ball mats, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figures 1, 2:
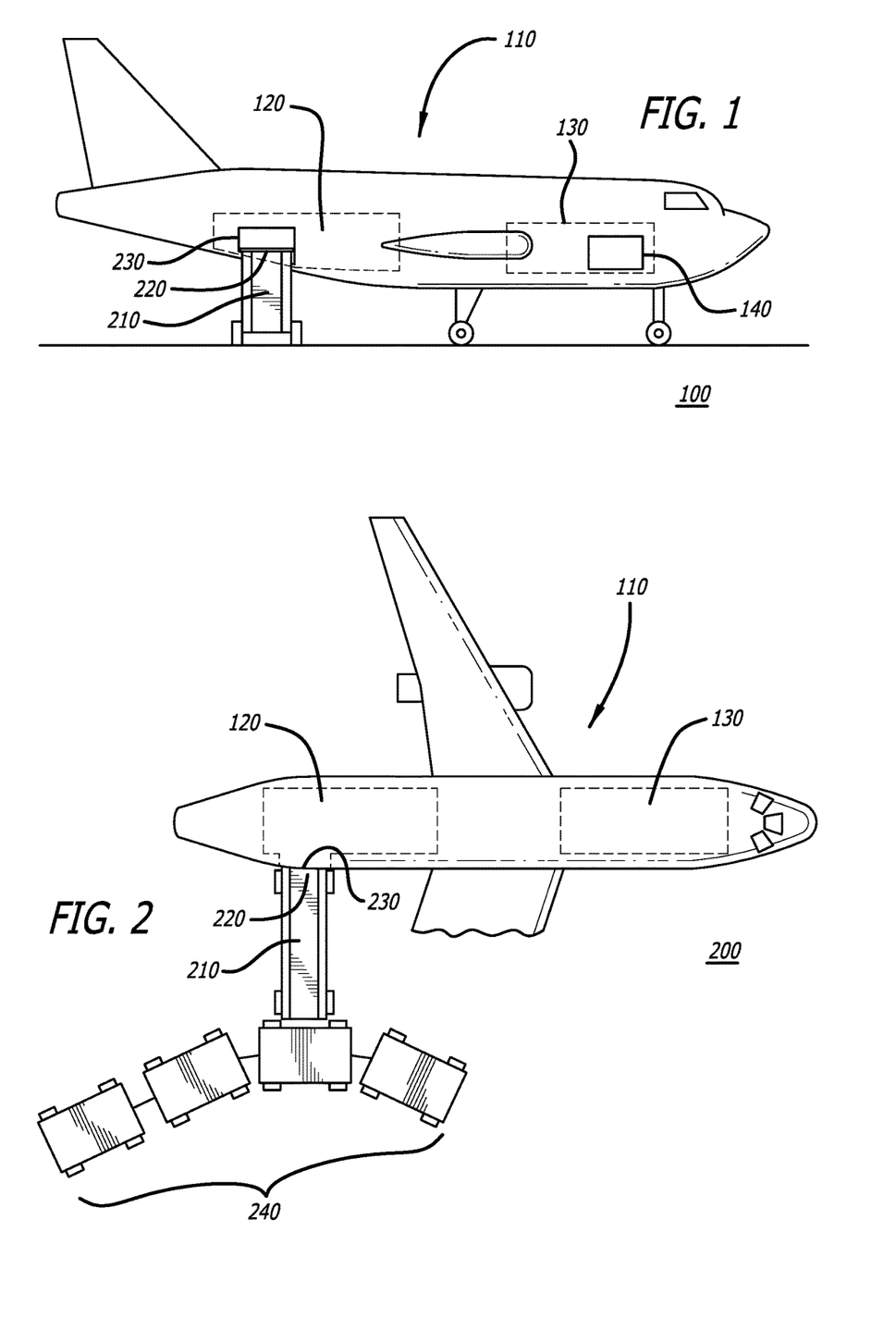
FIG. 1 is a diagram depicting a side view of an exemplary aircraft comprising a sloped compartment that may be employed by the disclosed system for transferring cargo across a stepped threshold and into a sloped compartment, in accordance with at least one embodiment of the present disclosure.
FIG. 2 is a diagram showing a top view of the exemplary aircraft of FIG. 1, in accordance with at least one embodiment of the present disclosure.

FIG. 1 is a diagram 100 depicting a side view of an exemplary aircraft 110 comprising a sloped compartment 120 that may be employed by the disclosed system for transferring cargo across a stepped threshold and into a sloped compartment, in accordance with at least one embodiment of the present disclosure. In this figure, the aircraft 110 is shown to have two cargo compartments (i.e. 120, 130). The aft cargo compartment is a sloped compartment 120. And, the forward cargo compartment is a non-sloped compartment 130. Also shown is a doorway 230 to the sloped compartment 120, and a doorway 140 to the non-sloped compartment. An end 220 of a ground-based cargo conveyor-belt loader 210 is shown to be located proximate to the doorway 230 to the sloped compartment 120 of the aircraft 110.

FIG. 2 is a diagram 200 showing a top view of the exemplary aircraft 110 of FIG. 1, in accordance with at least one embodiment of the present disclosure. In this figure, the end 220 of the ground-based cargo conveyor-belt loader 210 is shown to be located proximate to the doorway 230 to the sloped compartment 120 of the aircraft 110. During the loading of cargo (not shown) into the sloped compartment 120 of the aircraft 110, cargo is loaded by cargo handlers off of the ground-based baggage carts 240 and onto the ground-based cargo conveyor-belt loader 210. The ground-based cargo conveyor-belt loader 210 moves the cargo to the end 220 of the ground-based cargo conveyor-belt loader 210, which is located proximate the doorway 230 of the sloped compartment 120. Then, the cargo is moved by cargo handlers across the doorway 230 threshold and into the sloped compartment 120.

Figure 3:
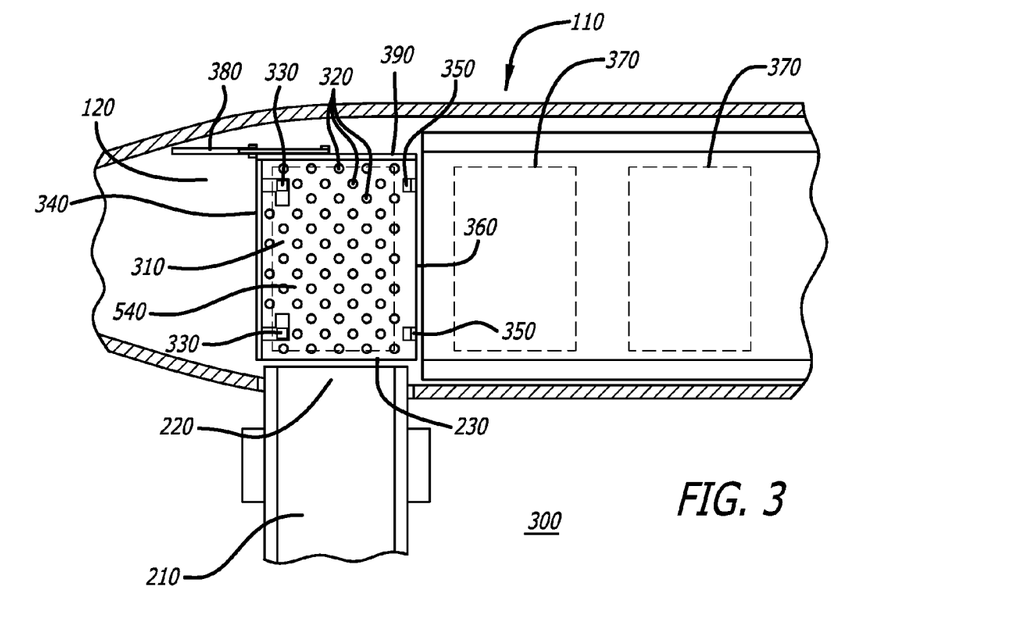
FIG. 3 is a diagram illustrating a top cut-away view of an aft portion of the exemplary aircraft of FIG. 1, in accordance with at least one embodiment of the present disclosure.

FIG. 3 is a diagram 300 illustrating a top cut-away view of an aft portion of the exemplary aircraft 110 of FIG. 1, in accordance with at least one embodiment of the present disclosure. In this figure, two pieces of cargo 370 are shown to be loaded into the sloped compartment 120 of the aircraft 110.

Also, in this figure, the disclosed ball mat 310 is shown to be installed in the sloped compartment 120 proximate the doorway 230. The surface 540 of the ball mat 310 is shown to comprise a plurality of roller balls 320. It should be noted that in other embodiments, less roller balls 320 or more roller balls 320 may be employed by the ball mat 310 than is illustrated in FIG. 3. In one or more embodiments, the roller balls 320 may be one inch (1") diameter spherical balls each supported by one-eighth inch (⅛") diameter bearings that allows for the horizontal movement of cargo 370 in all directions. It should be noted that in other embodiments, the roller balls 320 may be larger or smaller than 1" in diameter, and the diameter of the bearings supporting each of the roller balls 320 may be larger or smaller than ⅛". Also, the roller balls 320 may be spaced approximately six inches (6") apart from one another. It should be noted that in other embodiments, the spacing between the roller balls 320 may be larger or smaller than 6". Also, the roller balls 320 may be substituted by other conveyance devices or features. It should be noted that in other embodiments, the conveyance devices may be of a different design than roller balls that performs a similar function as roller balls.

In addition, the ball mat 310 is shown to comprise two container stop levers 330, which are located proximate a first side 340 (i.e. towards the aft area of the aircraft 110) of the ball mat 310. Also, the ball mat 310 is shown to comprise two container stops 350, which are located proximate a second side 360 (i.e. towards the forward area of the aircraft 110) of the ball mat 310. It should be noted that in other embodiments, the ball mat 310 may employ less than or more than two container stop levers 330, and the ball mat 310 may employ less than or more than two container stops 350.

In addition, the ball mat 310 is shown to include a manual lever 380, which is used to configure the ball mat 310 to a sloped position and to a substantially horizontal position. The manual lever 380 is shown to be attached to a third side 390 of the ball mat 310. It should be noted that in other embodiments, the manual lever 380 may be attached to other parts of the ball mat 310 than as is shown in FIG. 3. It should be noted that in other embodiments, the manual lever 380 may be substituted by an electrical motor and/or a hydraulic or pneumatic actuator.

Figure 4:
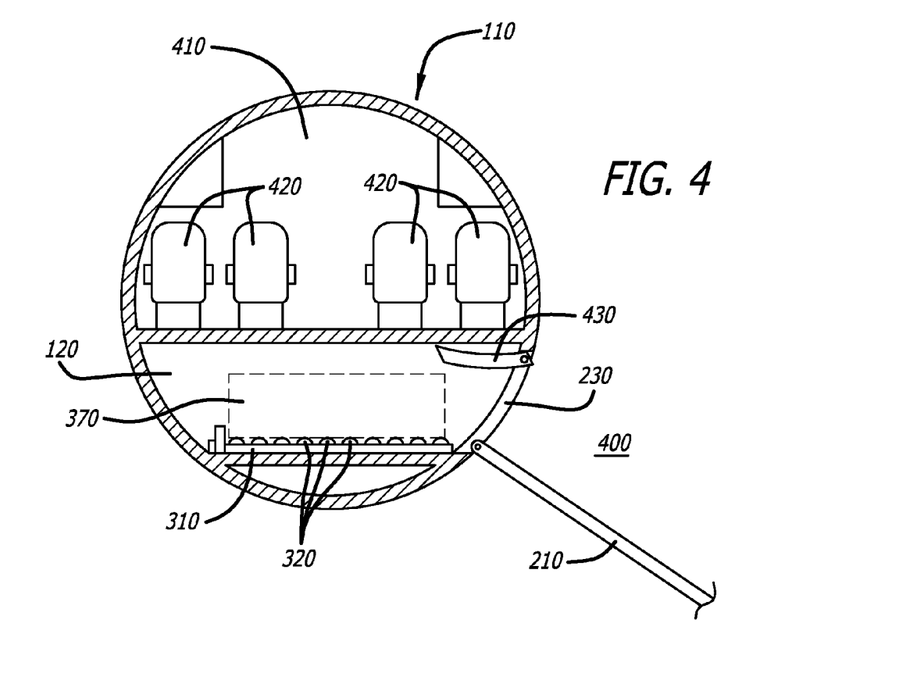
FIG. 4 is a diagram showing a side cut-away view of an aft portion of the exemplary aircraft of FIG. 1, in accordance with at least one embodiment of the present disclosure.

FIG. 4 is a diagram 400 showing a side cut-away view of an aft portion of the exemplary aircraft 110 of FIG. 1, in accordance with at least one embodiment of the present disclosure. In this figure, this cut-away view shows the sloped compartment 120 located beneath the passenger compartment 410, which contains passenger seats 420. The door 430 to the sloped compartment 120 is shown to be open, and the ball mat 310 is shown to be installed within the sloped compartment 120 and proximate the doorway 230 of the sloped compartment 120.

Figure 5:
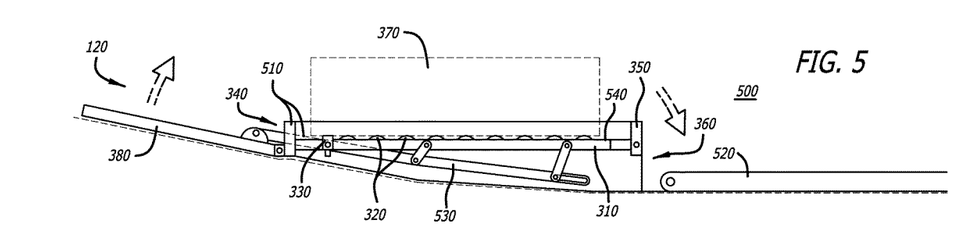
FIG. 5 is a diagram depicting cargo being loaded onto a ball mat, in a substantially horizontal position, of the disclosed system for transferring cargo across a stepped threshold and into a sloped compartment, in accordance with at least one embodiment of the present disclosure.
Figure 6:
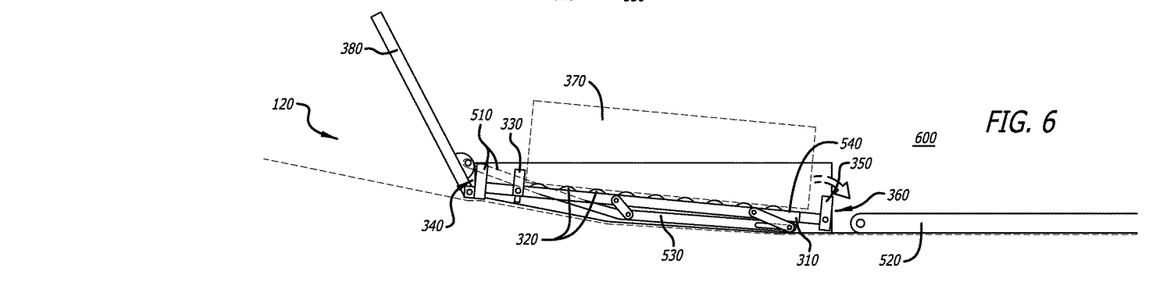
FIG. 6 is a diagram showing the ball mat, containing cargo, being configured in a sloped position, of the disclosed system for transferring cargo across a stepped threshold and into a sloped compartment, in accordance with at least one embodiment of the present disclosure.
Figure 7:
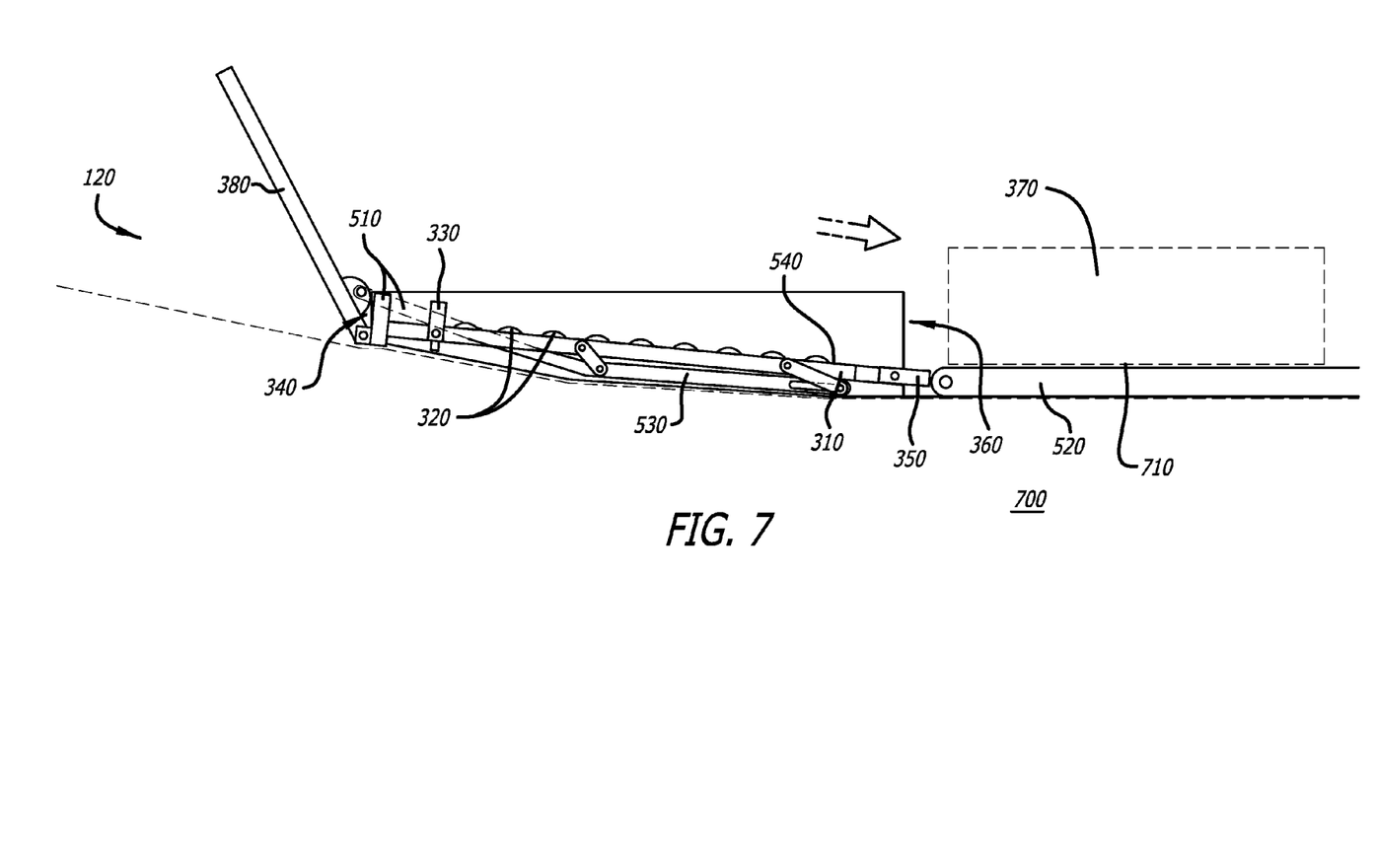
FIG. 7 is a diagram illustrating cargo being moved off of the ball mat of the disclosed system for transferring cargo across a stepped threshold and into a sloped compartment, in accordance with at least one embodiment of the present disclosure.

FIGS. 5 through 7 illustrate the steps of cargo 370 being transferred across a stepped threshold and into a sloped compartment 120, in accordance with at least one embodiment of the present disclosure. In particular, these figures illustrate the linkage mechanism 530 used to configure the ball mat 310 from a substantially horizontal position to a sloped position, in accordance with at least one embodiment of the present disclosure.

FIG. 5 is a diagram 500 depicting cargo 370 being loaded onto a ball mat 310, in a substantially horizontal position, of the disclosed system for transferring cargo across a stepped threshold and into a sloped compartment, in accordance with at least one embodiment of the present disclosure. In this figure, cargo 370 has been moved across the stepped threshold of the doorway of the sloped compartment 120 and onto the ball mat 310 located within the sloped compartment 120. The ball mat 310 is shown to be configured in a substantially horizontal position. The ball mat 310 is configured to the substantially horizontal position by the manual lever 380 being moved to a down position, as is shown in this figure. The manual lever 380 is connected to a linkage mechanism 530, which enables the ball mat 310 to be configured to a substantially horizontal position and to a sloped position. It should be noted that in some embodiments, the ball mat 310 may be configured to the substantially horizontal position and to the sloped position by using the manual lever 380, an electrical motor and/or a hydraulic or pneumatic actuator.

Figure 13:
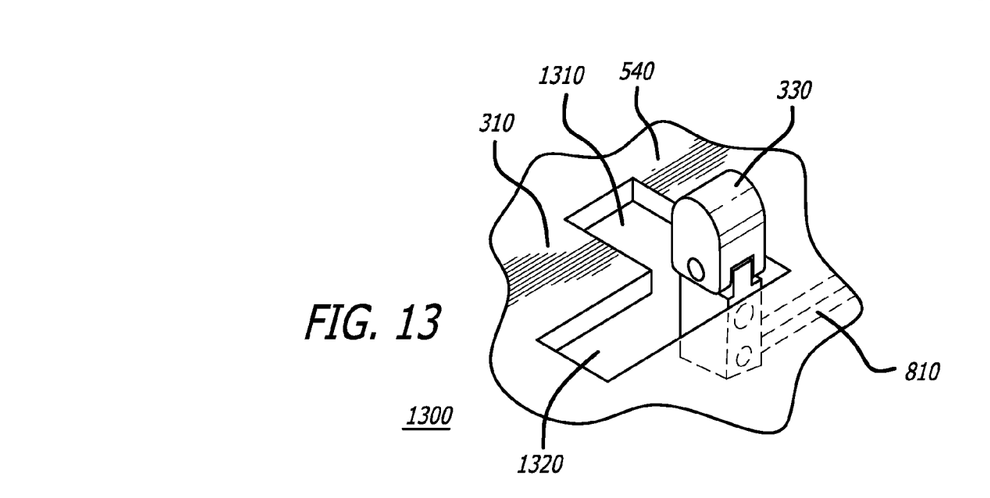
FIG. 13 is a diagram showing details of the design for a container stop lever, in accordance with at least one embodiment of the present disclosure.

Also shown in this figure, when the cargo 370 is moved onto the ball mat 310, the container stop lever 330, located proximate a first side 340 of the ball mat 310 and on the surface 540 of the ball mat 310, is configured in a down position such that the container stop lever 330 is flush with the surface 540 of the ball mat 310. Refer to FIG. 13 to view the details of the movement of the container stop lever 330. In addition, when the cargo 370 is moved onto the ball mat 310, a container stop 350, located proximate a second side 360 of the ball mat 310 and on the surface 540 of the ball mat 310, is configured in an unrestrained up position. Also shown in this figure are guide rails 510 that are used to secure the cargo 370 from moving off the ball mat 310.

FIG. 6 is a diagram 600 showing the ball mat 310, containing cargo 370, being configured in a sloped position, of the disclosed system for transferring cargo across a stepped threshold and into a sloped compartment, in accordance with at least one embodiment of the present disclosure. In this figure, the ball mat 310 is configured to the sloped position by the manual lever 380 being moved to an up position, as is shown in this figure. Also shown in this figure, the cargo 370 has moved towards the second side 360 of the ball mat 310 such that the container stop lever 330, which contains a spring-loaded mechanism, has been released and is now in an up position.

FIG. 7 is a diagram 700 illustrating cargo 370 being moved off of the ball mat 310 of the disclosed system for transferring cargo across a stepped threshold and into a sloped compartment, in accordance with at least one embodiment of the present disclosure. In this figure, the container stop 350 is configured in an unrestrained down position, thereby allowing the cargo 370 to move off of the ball mat 310. It should be noted that in some embodiments, the container stop 350 may be configured in an up position or in a down position by using the manual force, a spring-loaded mechanism, an electrical motor and/or a hydraulic or pneumatic actuator. Also shown in this figure, the cargo 370 is shown to have moved off of the ball mat 310 and onto a conveyor belt 520 (e.g., a Telair sliding carpet conveyor belt), which has a surface 710 at about the same height as the surface 540 of the ball mat 310.

FIGS. 8 through 12 illustrate the steps of cargo 370 being transferred across a stepped threshold and into a sloped compartment 120 as well as the cargo 370 being removed from the sloped compartment 120 and across the stepped threshold, in accordance with at least one embodiment of the present disclosure. In particular, these figures illustrate the bar mechanism 810 used to configure the container stop 350 in an up position or in a down position, in accordance with at least one embodiment of the present disclosure. It should be noted that in one or more embodiments, the disclosed ball mat 310 employs both the linkage mechanism 530 shown in FIGS. 5 through 7 as well as the bar mechanism 810 shown in FIGS. 8 through 12.

Figure 8:
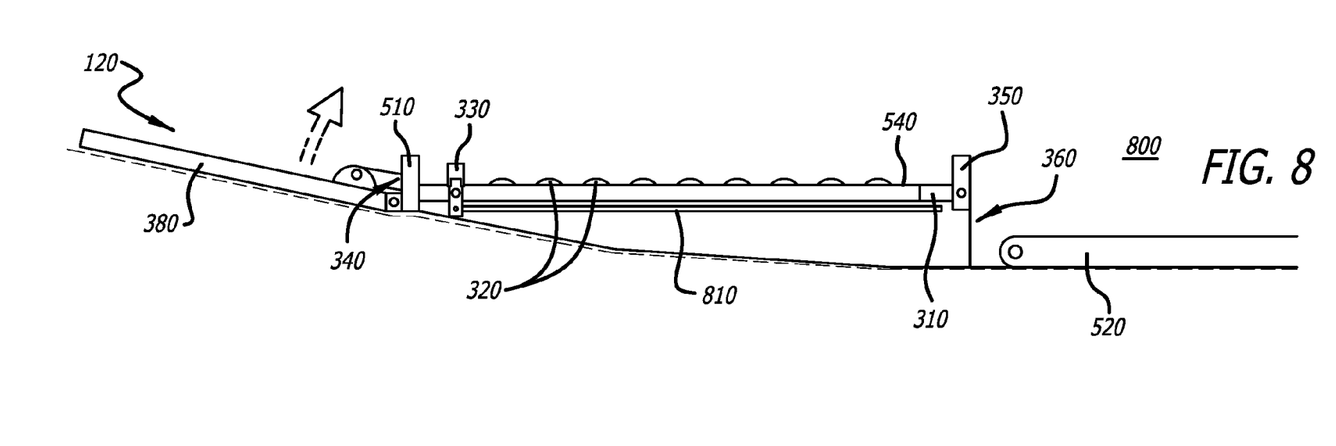
FIG. 8 is a diagram depicting the ball mat, in a substantially horizontal position, of the disclosed system for transferring cargo across a stepped threshold and into a sloped compartment, in accordance with at least one embodiment of the present disclosure.

FIG. 8 is a diagram 800 depicting the ball mat 310, in a substantially horizontal position, of the disclosed system for transferring cargo across a stepped threshold and into a sloped compartment, in accordance with at least one embodiment of the present disclosure. In this figure, the ball mat 310 is shown to be configured in a substantially horizontal position. The ball mat 310 is configured to the substantially horizontal position by the manual lever 380 being moved to a down position, as is shown in this figure. Also shown in this figure, the container stop lever 330, located proximate a first side 340 of the ball mat 310 and on the surface 540 of the ball mat 310, is configured in an up position. Refer to FIG. 13 to view the details of the movement of the container stop lever 330. In addition, the container stop 350, located proximate a second side 360 of the ball mat 310 and on the surface 540 of the ball mat 310, is configured in an up position.

Figure 9:
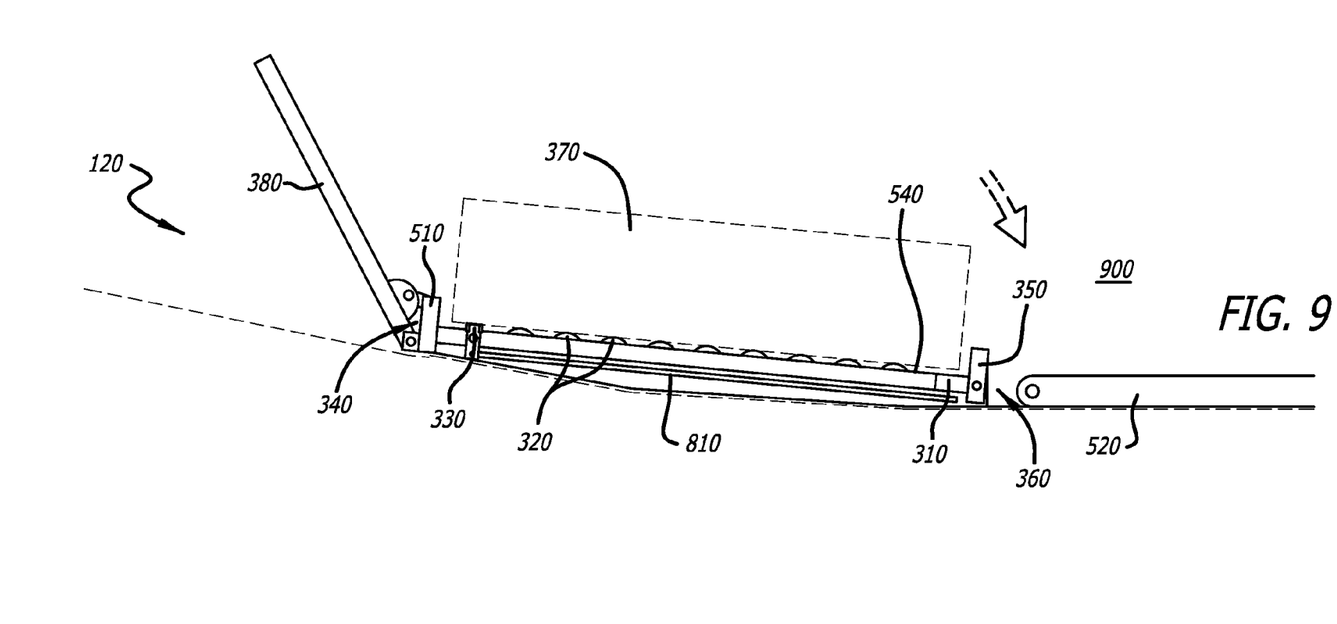
FIG. 9 is a diagram showing the ball mat, being configured in a sloped position, of the disclosed system for transferring cargo across a stepped threshold and into a sloped compartment, in accordance with at least one embodiment of the present disclosure.

FIG. 9 is a diagram 900 showing the ball mat 310, being configured in a sloped position, of the disclosed system for transferring cargo across a stepped threshold and into a sloped compartment, in accordance with at least one embodiment of the present disclosure. In this figure, the ball mat 310 is configured to the sloped position by the manual lever 380 being moved to an up position, as is shown in this figure. Also shown in this figure, when the cargo 370 is moved onto the ball mat 310, the container stop lever 330 is configured in a down position such that the container stop lever 330 is flush with the surface 540 of the ball mat 310. In addition, when the cargo 370 is moved onto the ball mat 310, a container stop 350 is configured in an unrestrained up position.

Figures 10, 11:
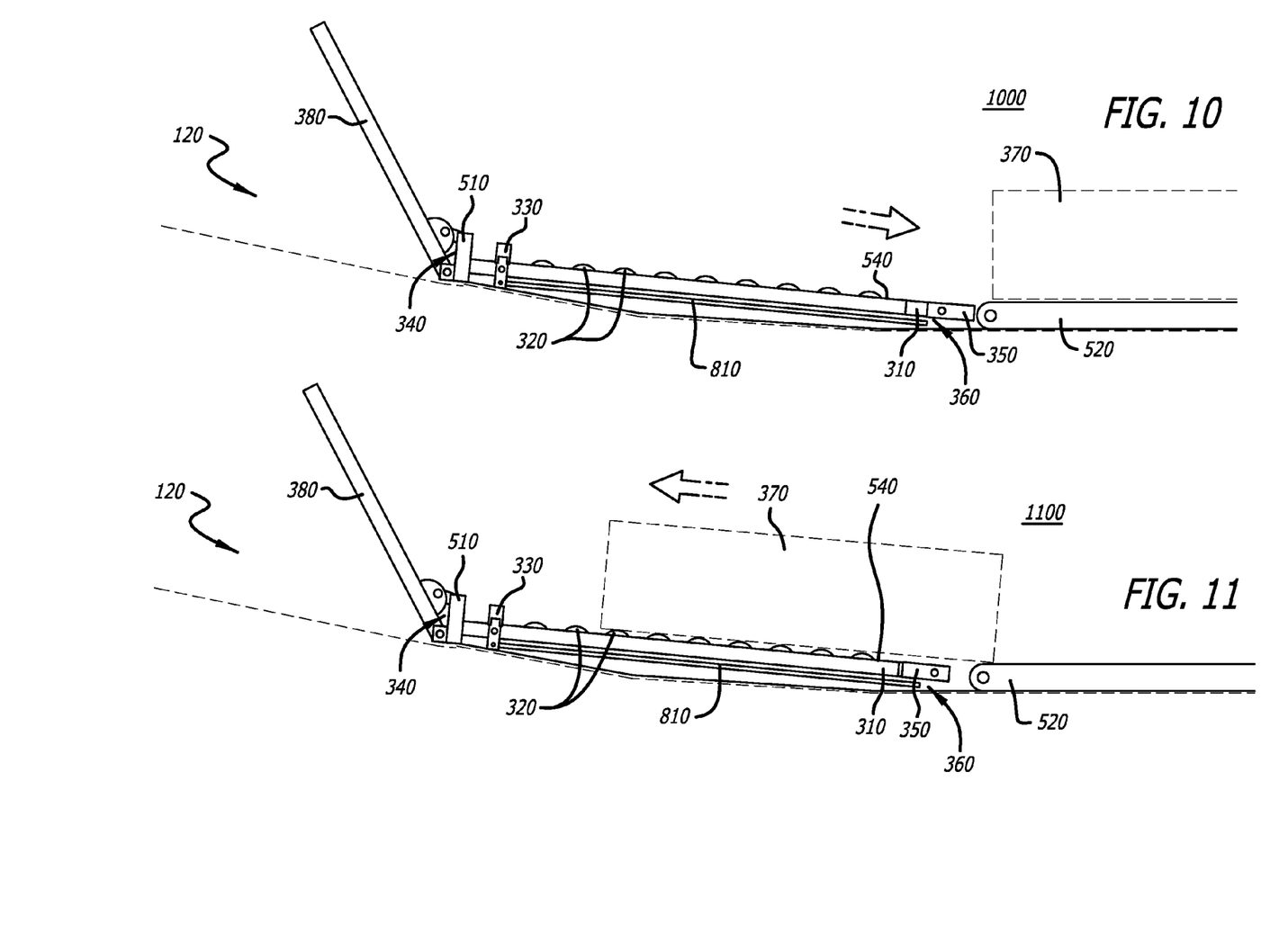
FIG. 10 is a diagram illustrating cargo being moved off of the ball mat of the disclosed system for transferring cargo across a stepped threshold and into a sloped compartment, in accordance with at least one embodiment of the present disclosure.
FIG. 11 is a diagram depicting cargo being moved onto the ball mat of the disclosed system for removing cargo from a sloped compartment and across a stepped threshold, in accordance with at least one embodiment of the present disclosure.

FIG. 10 is a diagram 1000 illustrating cargo 370 being moved off of the ball mat 310 of the disclosed system for transferring cargo across a stepped threshold and into a sloped compartment 120, in accordance with at least one embodiment of the present disclosure. In this figure, the container stop 350 is configured in an unrestrained down position, thereby allowing the cargo 370 to move off of the ball mat 310. Also shown in this figure, the cargo 370 is shown to have moved off of the ball mat 310 and onto a conveyor belt 520. In addition, it should be noted that after the cargo 370 has slid off of the ball mat 310, the container stop lever 330, being spring-loaded, is now in an up position.

FIG. 11 is a diagram 1100 depicting cargo 370 being moved onto the ball mat 310 of the disclosed system for removing cargo from a sloped compartment and across a stepped threshold, in accordance with at least one embodiment of the present disclosure. In this figure, the container stop 350 is configured in an unrestrained down position, thereby allowing the cargo 370 to move onto the ball mat 310. Also shown in this figure, the cargo 370 is shown to have moved onto the ball mat 310 from the conveyor belt 520.

Figure 12:
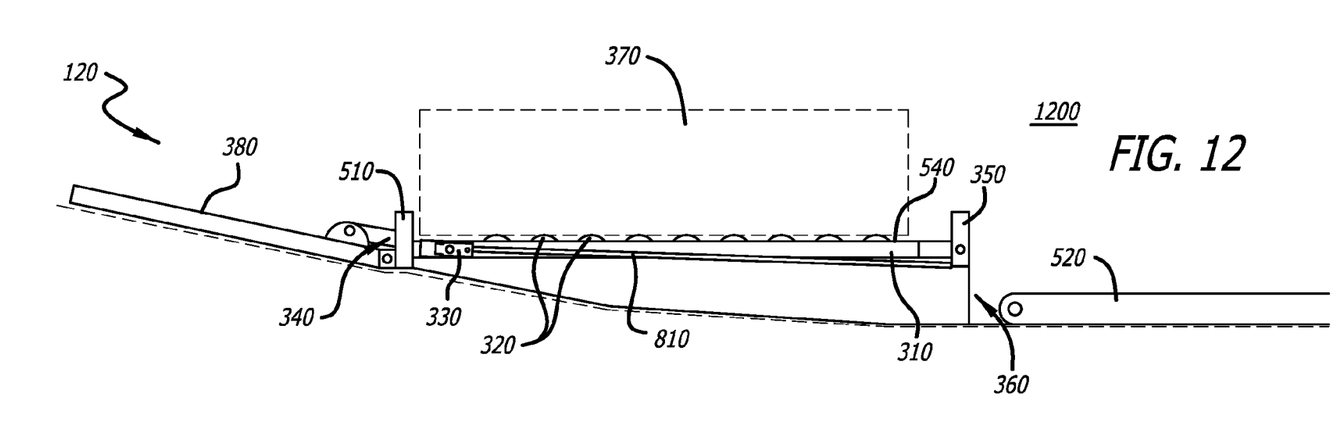
FIG. 12 is a diagram showing the ball mat, containing cargo, being configured in a substantially horizontal position, of the disclosed system for removing cargo from a sloped compartment and across a stepped threshold, in accordance with at least one embodiment of the present disclosure.

FIG. 12 is a diagram 1200 showing the ball mat 310, containing cargo 370, being configured in a substantially horizontal position, of the disclosed system for removing cargo from a sloped compartment and across a stepped threshold, in accordance with at least one embodiment of the present disclosure. In this figure, the ball mat 310 is configured to the substantially horizontal position by the manual lever 380 being moved to a down position, as is shown in this figure. When the cargo 370 moves onto the ball mat 310 towards the first side 340 of the ball mat, the container stop lever 330 is moved, by the cargo 370, to a down position such that the container stop lever 330 is flush with the surface 540 of the ball mat 310. When the cargo 370 moves the container stop lever 330 to the down position, the bar mechanism 810, which is connected to the container stop lever 330, shifts and restrains the container stop 350 in a restrained up position, as is shown in the figure, thereby securing the cargo 370 from moving off of the ball mat 310.

FIG. 13 is a diagram 1300 showing details of the design for a container stop lever 330, in accordance with at least one embodiment of the present disclosure. This figure shows how the container stop lever 330 is designed to move to a down position in two directions (i.e. a first direction 1310 and a second direction 1320). When cargo 370 is moved from the ground-based cargo conveyor-belt loader 210 across the stepped threshold and onto the ball mat 310, the cargo 370 moves the upper end of the container stop lever 330 in a first direction 1310 to a down position. The container stop lever 330 has a spring-loaded mechanism in the first direction 1310. As such, when the cargo 370 is moved off of the ball mat 310 and onto the conveyor belt 520, the container stop lever 330 moves to an up position via the spring-loaded mechanism.

When the cargo 370 moves onto the ball mat 310 from the conveyor belt 520, the cargo 370 moves the upper end and lower end of the container stop lever 330 in a second direction 1320 to a down position. When the container stop lever 330 moves in the second direction 1320 to a down position, the bar mechanism 810, which is connected to the container stop lever 330 bears against the container stop 350 and restrains the container stop 350 in an up position.

Figure 14:
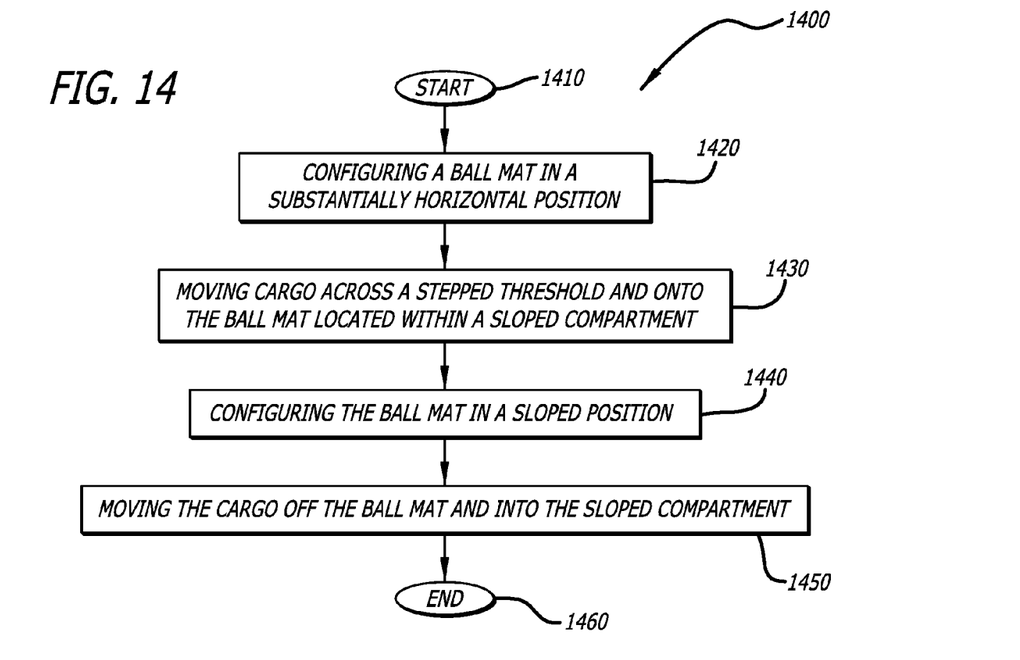
FIG. 14 is a flow chart depicting the disclosed method for transferring cargo across a stepped threshold and into a sloped compartment, in accordance with at least one embodiment of the present disclosure.

FIG. 14 is a flow chart depicting the disclosed method 1400 for transferring cargo across a stepped threshold and into a sloped compartment, in accordance with at least one embodiment of the present disclosure. At the start 1410 of the method 1400, a ball mat is configured in a substantially horizontal position 1420. Cargo is then moved from the ground-based cargo conveyor-belt loader across a stepped threshold and onto the ball mat located within a sloped compartment 1430. Then, the ball mat is configured in a sloped position 1440. Cargo is then moved off of the ball mat and into the sloped compartment 1450. Then, the method 1400 ends 1460.

Figure 15:
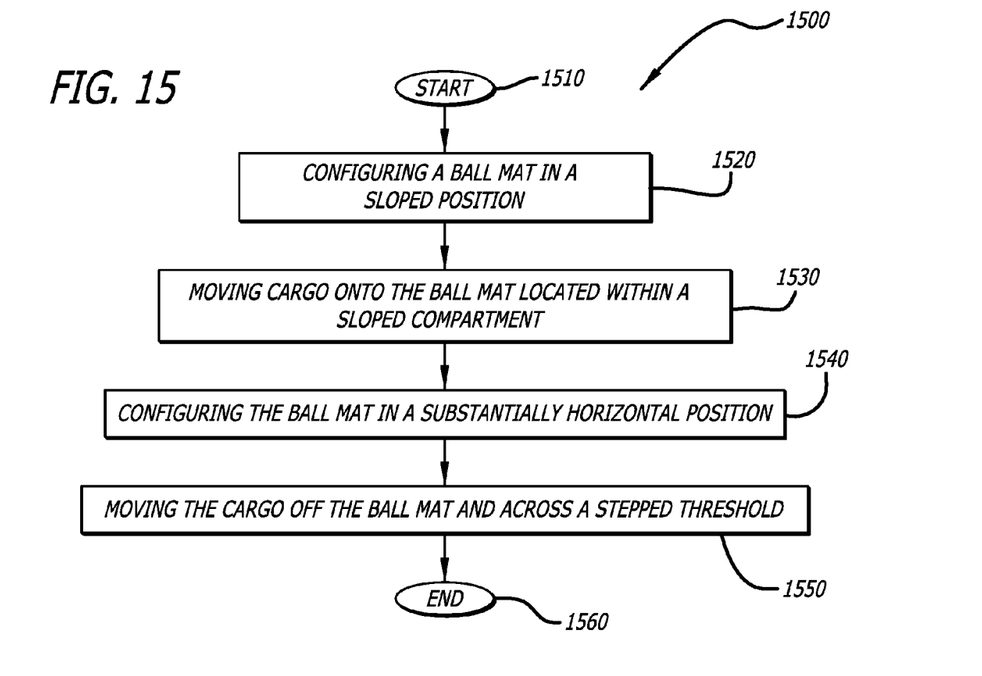
FIG. 15 is a flow chart depicting the disclosed method for removing cargo from a sloped compartment and across a stepped threshold, in accordance with at least one embodiment of the present disclosure.

FIG. 15 is a flow chart depicting the disclosed method 1500 for removing cargo from a sloped compartment and across a stepped threshold, in accordance with at least one embodiment of the present disclosure. At the start 1510 of the method 1500, a ball mat is configured in a sloped position 1520. Then, cargo is moved onto the ball mat located within a sloped compartment 1530. The ball mat is then configured in a substantially horizontal position 1540. Then, cargo is moved off of the ball mat and across a stepped threshold 1550.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less parts of the methods may be performed. In addition, all or some parts of the methods 1400, 1500 of FIGS. 14 and 15 may be performed together, in varying sequences.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for transferring cargo across a stepped threshold and into a sloped compartment, the method comprising:
moving the cargo across the stepped threshold and onto a ball mat located within the sloped compartment, wherein the ball mat is in a substantially horizontal position,
wherein a surface of the ball mat comprises at least one conveyance device;
configuring the ball mat in a sloped position such that the ball mat is not substantially parallel to the stepped threshold; and
moving the cargo off the ball mat and into the sloped compartment.

2. The method of claim 1, wherein the method further comprises configuring the ball mat in the substantially horizontal position.

3. The method of claim 2, wherein the configuring of the ball mat in the substantially horizontal position is enabled by using a manual lever, an electrical motor, a hydraulic actuator, a pneumatic actuator, or a combination thereof.

4. The method of claim 1, wherein the configuring of the ball mat in the sloped position is enabled by using a manual lever, an electrical motor, a hydraulic actuator, a pneumatic actuator, or a combination thereof.

5. The method of claim 1, wherein when the cargo is moved onto the ball mat, at least one container stop lever, located proximate a first side of the ball mat and on the surface of the ball mat, is configured in a down position such that the at least one container stop lever is flush with the surface of the ball mat.

6. The method of claim 1, wherein when the cargo is moved onto the ball mat, at least one container stop, located proximate a second side of the ball mat and on the surface of the ball mat, is configured in an unrestrained up position.

7. The method of claim 1, wherein when the ball mat is configured in the sloped position, at least one container stop, located proximate a second side of the ball mat and on the surface of the ball mat, is configured in an unrestrained down position, thereby allowing the cargo to move off of the ball mat.

8. The method of claim 1, wherein the sloped compartment is a cargo compartment of an aircraft.

9. The method of claim 1, wherein the at least one conveyance device is at least one of at least one roller ball and at least one caster.

10. A method for removing cargo from a sloped compartment and across a stepped threshold, the method comprising:
moving the cargo onto a ball mat located within the sloped compartment, wherein the ball mat is in a sloped position such that the ball mat is not substantially parallel to the stepped threshold,
wherein a surface of the ball mat comprises at least one conveyance device;
configuring the ball mat in a substantially horizontal position; and
moving the cargo off the ball mat and across the stepped threshold.

11. The method of claim 10, wherein the method further comprises configuring the ball mat in the sloped position.

12. The method of claim 11, wherein the configuring of the ball mat in the sloped position is enabled by using a manual lever, an electrical motor, a hydraulic actuator, a pneumatic actuator, or a combination thereof.

13. The method of claim 10, wherein the configuring of the ball mat in the substantially horizontal position is enabled by using a manual lever, an electrical motor, a hydraulic actuator, a pneumatic actuator, or a combination thereof.

14. The method of claim 10, wherein when the cargo is moved onto the ball mat, at least one container stop, located proximate a second side of the ball mat and on the surface of the ball mat, is configured in an unrestrained down position, thereby allowing the cargo to move onto the ball mat.

15. The method of claim 10, wherein when the cargo is moved onto the ball mat, at least one container stop lever, located proximate a first side of the ball mat and on the surface of the ball mat, is configured in an up position, thereby securing the cargo from moving towards the first side of the ball mat.

16. The method of claim 10, wherein when the ball mat is configured in the substantially horizontal position, at least one container stop lever, located proximate a first side of the ball mat and on the surface of the ball mat, is configured in a down position such that the at least one container stop lever is flush with the surface of the ball mat.

17. The method of claim 10, wherein when the ball mat is configured in the substantially horizontal position, at least one container stop, located proximate a second side of the ball mat and on the surface of the ball mat, is configured in a restrained up position, thereby securing the cargo from moving off of the ball mat.

18. The method of claim 10, wherein the sloped compartment is a cargo compartment of an aircraft.

19. A system for transferring cargo across a stepped threshold and into a sloped compartment, the system comprising:
a ball mat located within the sloped compartment,
wherein a surface of the ball mat comprises at least one conveyance device,
wherein when the cargo is moved across the stepped threshold, the ball mat is configured in a substantially horizontal position, and
wherein the ball mat is configured in a sloped position, such that the ball mat is not substantially parallel to the stepped threshold, to move the cargo off of the ball mat and into the sloped compartment.

20. The system of claim 19, wherein the ball mat further comprises at least one container stop lever, located proximate a first side of the ball mat and on the surface of the ball mat, configurable in one of an up position or a down position.

21. The system of claim 19, wherein the ball mat further comprises at least one container stop, located proximate a second side of the ball mat and on the surface of the ball mat, configurable in one of an up position or a down position.

22. The system of claim 19, wherein the ball mat is enabled to be configured in one of the sloped position or the substantially horizontal position by using a manual lever, an electrical motor, a hydraulic actuator, a pneumatic actuator, or a combination thereof.

* * * * *